United States Patent

[11] 3,573,884

| [72] | Inventor | Hans Pollinger |
| | | Munich, Germany |
| [21] | Appl. No. | 829,973 |
| [22] | Filed | June 3, 1969 |
| [45] | Patented | Apr. 6, 1971 |
| [73] | Assignee | Knorr-Bremse GmbH |
| | | Munich, Germany |
| [32] | Priority | June 7, 1968 |
| [33] | | Germany |
| [31] | | P 17 55 671.7-21 |

[54] AIR BELLOWS SUSPENSION SYSTEM FOR VEHICLES
3 Claims, 1 Drawing Fig.

[52] U.S. Cl............................................. 280/124,
105/164
[51] Int. Cl........................................ B60g 21/06
[50] Field of Search........................................ 280/124, 6,
112.1; 105/164, 4, 197 (B)

[56] References Cited
UNITED STATES PATENTS

| 779,858 | 1/1905 | Lillie............................ | 105/197(B) |
| 2,967,062 | 1/1961 | D'Avigdor................... | 280/112.1 |
| 3,035,852 | 5/1962 | Hanna.......................... | 280/124F |
| 3,089,710 | 5/1963 | Fiala............................. | 280/112.1 |

*Primary Examiner*—Philip Goodman
*Attorney*—Edmund M. Jaskiewicz

ABSTRACT: A vehicle having an air supply conduit therethrough has pneumatic bellows supporting both sides of the vehicle body. An axle-driven compressor pumps air from one bellows to another depending on the direction of the curved path the vehicle is travelling. An air supply reservoir is connected through a check valve to the air supply conduit and to the bellows. A pressure regulator is connected to the compressor discharge and to the air reservoir. A valve system connects the compressor intake and discharge to the bellows on both sides of the vehicle when the vehicle travels along a curved path to pump air from the bellows on the inside of a curve to the bellows on the outside of a curve. When the vehicle travels along a straight path air is pumped to the air supply reservoir whose maximum filled pressure is greater than the pressure in the air supply conduit. In response to the maximum filled pressure of the reservoir the pressure regulator will connect the compressor discharge to the atmosphere so that air is pumped to the atmosphere after the reservoir has been filled.

PATENTED APR 6 1971 3,573,884
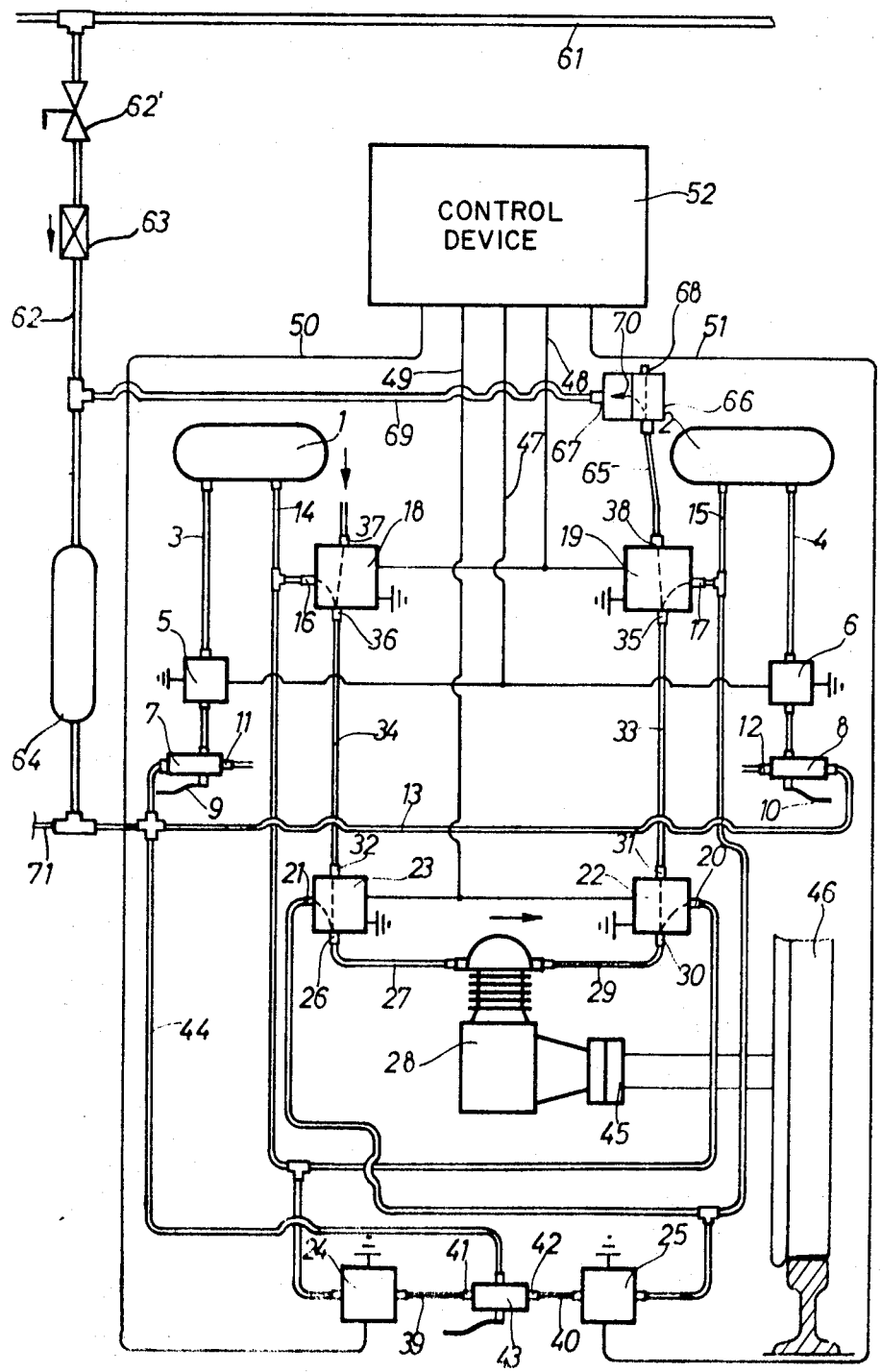
INVENTOR
HANS PÖLLINGER
ATTORNEY

AIR BELLOWS SUSPENSION SYSTEM FOR VEHICLES

The present invention to a pneumatic suspension system for vehicles, more particularly, to an arrangement for connecting the intake and discharge of a compressor to the supporting bellows on both sides of the vehicle body, to a supply reservoir for the bellows or to the atmosphere in response to curvilinear or rectilinear travel of the vehicle.

Various forms of pneumatic suspension systems have been devised for road and rail vehicles which tilt the vehicle body in response in travel of the vehicle along a curved path. In a copending application filed Mar. 18, 1969 and having Ser. No. 808,225 there is disclosed a pneumatic suspension system having pneumatic supporting bellows means on each side of the vehicle body. A compressor having an intake and a discharge is continuously driven from an axle of the vehicle at least when the vehicle is travelling above a predetermined speed. A plurality of shutoff valves are connected to the compressor intake and discharge and to the bellows means to open the intake and discharge to the atmosphere when the vehicle travels in a straight line. In response to angular acceleration of the vehicle about a vertical axis the valves are actuated to connect the intake of the compressor with the bellows means on the vehicle side acted upon by the angular acceleration with respect to the front of the vehicle and the compressor discharge is connected to the bellows means on the other side of the vehicle. This arrangement pumps air from the bellows on the inside of a curved path to the bellows on the outside of the curved path with a minimum of delay.

The air that is required for the air suspension system is supplied from a conduit connected to a source of compressed air. However, for long trains the requirement for air may be so great that the capacity of the supply conduit and source may be insufficient and it may not be feasible to increase the source and conduit. Because of this inadequacy of an air supply such air suspension systems are not used for longer trains.

It is therefore the principal object of the present invention to provide a novel and improved air suspension system for vehicles.

It is another object of the present invention to provide an air suspension system which will impose only a moderate demand on the air supply conduit of a railway vehicle and thus can be used in trains of greater length.

According to the present invention a pneumatic suspension system for vehicles may comprise pneumatic supporting bellows means on each side of the vehicle body. There is an axle-driven compressor having an intake and discharge and operating at least above a predetermined speed of the vehicle. Air is also supplied to the bellows means from an air reservoir connected through a check valve to an air supply conduit in the vehicle. A pressure regulator is connected between the compressor discharge and the air reservoir. Valve means are provided to connect the compressor intake and discharge with the bellows means so that air is pumped from the bellows on the inside of the curve to the bellows on the outside of the curve when the vehicle is proceeding along a curvilinear path. When the vehicle travels in a straight path, the compressor discharges air into the air reservoir until the pressure in the reservoir reaches a predetermined maximum at which time the pressure regulator is actuated to connect the compressor discharge with the atmosphere. The compressor is thus connected with a pressure regulator in such a manner that when the discharge from the compressor is not used for supplying air to the bellows to tilt the vehicle the compressor will first fill the air reservoir and only then will air be discharged to the atmosphere.

Other objects and advantages of the present invention will be apparent upon reference to the accompanying description when taken in conjunction with the drawing, which is exemplary, wherein;

FIG. 1 is a schematic diagram of the air suspension system for vehicles according to the present invention.

With reference to the drawing a specific embodiment of the present invention will be described in detail.

As may be seen in the drawing, the suspension system according to the present invention comprises air suspension cushions or bellows 1 and 2 which are positioned on opposite sides of the vehicle body and are each connected by conduits 3 and 4 to magnetic controlled shutoff valves 5 and 6 and to level regulating valves 7 and 8. The valves 7 and 8 are mounted on the air-cushioned vehicle body and are actuated by levers 9 and 10 which are pivotally connected to the noncushioned vehicle frame. The level regulating valves 7 and 8 have air outlet ports 11 and 12 and their inlets are connected by conduit 13 to a source of compressed air not shown in the drawing. The source of compressed air supplies air under pressure through an air supply conduit 61 within the vehicle and is connected through conduit 62 with the conduit 13. Connected in series in the conduit 62 is a shutoff valve 62', a check valve 63 and an air supply reservoir 64.

Each level regulating valve 7 and 8 controls the admission of compressed air into the air bellows 1 or 2 upon its respective side when the height of the bellows is too low. The admission of compressed air is controlled by pivotal movement of levers 9 and 10 while the respective shutoff valve 5 or 6 is open. When the level of a bellows 1 or 2 is too high with respect to the vehicle frame, the corresponding level regulating valve 7 or 8 is operated by pivoting of the corresponding lever 9 or 10 to permit compressed air to escape into the atmosphere through the corresponding outlet 11 or 12. Shutoff valves 5 and 6 will remain open. The level regulating valves 7 and 8 thus act to maintain the heights of the air bellows 1 and 2 constant.

The suspension bellows 1 and 2 are also connected through tubular conduits 14 and 15 with branch connections 16 and 17 to magnetic two-way valves 18 and 19. Conduit 14 also connects to inlet 20 of a magnetic two-way valve 22 and conduit 15 connects to inlet 21 of a magnetic two-way valve 23. Conduit 14 is also connected to a magnetic shutoff valve 24 and conduit 15 is connected to a magnetic shutoff valve 25.

Inlet 26 of the two-way valve 23 is connected to the intake conduit 27 of an air compressor 28. A compressor discharge or outlet conduit 29 is connected to inlet 30 of the two-way valve 22. The outlet connections 31 and 32 of the two-way valves 22 and 32 are connected by conduits 33 and 34 with the inlet connections 35 and 36 of the two-way valves 19 and 18 respectively.

The two-way valve 18 is provided with an outlet 37 which opens to the atmosphere. The outlet 38 of the two-way valve 19 is connected by a conduit 65 to a pressure regulator 66 provided with outlet ports 67 and 68. Port 68 opens to the atmosphere while the other outlet port 67 leads through a conduit 69 to the connection 62 between the check valves 63 and the air supply reservoir 64 so that the pressure regulator is connected to a known compressed air supply system.

The pressure regulator 66 is conventional and known in the art and has the usual components of a regulating valve, a pressure-limiting safety valve and a check valve indicated by the arrow 70 to prevent air from flowing through the conduit 69 in a direction opposite to the arrow 70 into the conduit 65. The check valve 63 in the connection 62 prevents compressed air from conduit 69 from flowing through the connection 62 into the air supply conduit 61.

The shutoff valves 24 and 25 are provided with connecting conduits 39 and 40 which lead to regulating connections 41 and 42 of a third level regulating valve 43. The connections 41 and 42 can be pneumatically connected to each other through the level regulating valve 43.

The level regulating valve 43 is positioned in about the central longitudinal plane of the vehicle so as to be responsive only to changes of elevation of the longitudinal tilting axis of the vehicle body and not to any tilting movements of the body about this longitudinal axis.

The level regulating valve 43 is supplied with compressed air from the conduit 13 through a conduit 44.

The compressor 28 is driven through a speed responsive coupling 45 connected to the axle upon which is mounted a railway wheel 46. By driving the compressor from an axle of the vehicle it is possible to control the response and functioning of the curve responsive control with respect to the speed of the vehicle. The clutch coupling 45 is controlled by the speed of the vehicle so that ordinarily the clutch will remain disengaged but will become automatically engaged whenever the vehicle speed exceeds a predetermined value. This arrangement saves the compressor from operation during slow vehicle speeds when the compressor is not actually needed.

The solenoid coils of the magnetic shutoff valves 5 and 6 are both connected to an electrical control lead 47. In a similar manner, the solenoid coils of the magnetic two-way vales 18 and 19 are connected to each other and to a control lead 48 and the solenoid coils of the two-way valves 22 and 23 are similarly connected to each other and to a control lead 49. The coils of magnetic valves 24 and 25 are energized separately through electrical leads 50 and 51 respectively. While in their normal unenergized positions all of the two-way valves 18, 19, 22 and 23 have their inlet connections 36, 35, 30 and 26 connected to their respective outlets 37, 38, 31 and 32. At rest and when nonenergized, the shutoff valves 5 and 6 remain open but shutoff valves 24 and 25 remain closed.

The several electrical control leads 47, 48, 49, 50 and 51 lead into a control device 52 which is known in the art and not illustrated in detail. The control device 52 is responsive to turning movements or angular acceleration of the vehicle about a vertical axis, or may be made responsive to the inclination or tilting of the vehicle body. The control device may also include devices known in the art which are responsive to signal generators positioned along the tracks of railway vehicles. The control device 52 controls the connecting of the control leads 47 to 51 to a voltage source which is not shown.

When the vehicle incorporating the system illustrated in the drawing is travelling along a straight path the control leads 47 to 51 are all disconnected from the voltage source. The two-way valves 18, 23, 22 and 19 therefore connect the compressor intake 27 with the atmosphere and the compressor discharge 29 with the pressure regulator 66 which supplies compressed air through conduits 69 and 62. Compressed air is thus supplied to the reservoir 64 until the pressure in the reservoir has been brought up to its maximum value which, by way of example, may be 1 atmosphere over the pressure in the air supply conduit 61. When the supply reservoir pressure reaches this maximum value the pressure regulator 66 will be actuated by its regulating valve (not shown) to discharge the compressed air through outlet port 68 to the atmosphere. This compressed air will continue to be discharged to the atmosphere until such time that the maximum pressure in the supply reservoir 64 drops below this predetermined value. During the time that the vehicle is travelling along a straight path the shutoff valves 5 and 6 are opened and the shutoff valves 24 and 25 are closed. The supply of compressed air to bellows 1 and 2 is then controlled only through level-regulating valves 7 and 8 while the third level-regulating valve 43 remains inoperative.

When the vehicle is moving at a sufficient speed to render the speed-responsive coupling 45 operative and the vehicle and its axle-driven compressor moves into the transition portion of a curved path to the right, the control device 52 will connect control leads 47, 49 and 50 with the voltage source. This will close shutoff valves 5 and 6, switch over two-way valves 22 and 23 and open shutoff valve 24. The level-regulating valves 7 and 8 will thus be disconnected from the respective bellows 1 and 2 and the compressor 28, without any significant delay, begins to pump air from bellows 2 through conduit 15, two-way valve 23 and intake conduit 27, through discharge conduit 29, two-way valve 22 and through conduit 14 to bellows 1. As a result, the height of bellows 2 will decrease and the height of bellows 1 will increase to tilt the vehicle body to the right.

When the vehicle body attains the angle of maximum tilt or when the angular acceleration becomes zero, the control device 52 will again disconnect lead 49 from the voltage source. This will stop the pumping of air from bellows 2 to bellows 1 because the compressor intake conduit 27 will now be open to the atmosphere and the compressor discharge conduit 29 will now be connected with the pressure regulator 66. The then existing tilted or inclined condition of the vehicle body will be retained and, depending on the pressure in the supply reservoir 64, the compressed air supplied from compressor 28 will be delivered by the pressure regulator 66 either to the atmosphere or to the reservoir 64.

As the vehicle comes out of the right curve the control device 52 will immediately connect lead 48 with the voltage source in response to an angular acceleration opposite in direction to that experienced when the vehicle entered the right curve. The control leads 47 and 50 will remain connected with the voltage source. Two-way valves 18 and 19, however, will be switched over to connect bellows 1 and 2 through conduits 14 or 15 and 34 or 33 and two-way valves 23 or 22 with the intake 27 or the discharge 29 of the compressor 28. The compressor 28 will now pump air from bellows 1 to bellows 2. This action will return the vehicle to its upright vertical position. As soon as the vehicle is in the vertical position and the angular acceleration experienced during the transition from the curvilinear to the rectilinear path has disappeared, the control device 52 will disconnect the control leads 47, 48 and 50 from the voltage source. The initial conditions will now be reestablished and the level control of the vehicle will now be effected through the reopened and shutoff valves 5 and 6 under the action of the level-regulating valves 7 and 8. The closing of shutoff valve 24 will render the level-regulating valve 43 ineffective. The intake conduit 27 of compressor 28 is again connected to the atmosphere and the discharge conduit 29 will again be connected with the pressure regulator 66 which in the manner described above will either discharge the air to the atmosphere or deliver the compressed air through conduits 69 and 62 to the supply reservoir 64. As the vehicle enters a left-hand curve, the control device 52 will respond to an angular acceleration and will connect the control leads 47, 48 and 51 to the voltage source. The two-way valves 18 and 19 will now be switched over to connect the intake conduit 27 with bellows 1 and the discharge conduit 29 with bellows 2. Compressor 28 will now pump air from bellows 1 into bellows 2 to tilt the vehicle body to the left. At the same time, shutoff valves 5 and 6 are closed and shutoff valve 25 is opened. As soon as the vehicle passes through the transition from rectilinear to curvilinear movement and enters the constant radius portion of the turn or maximum tilt of the vehicle body occurs, the control device 52 will disconnect control lead 48 from the voltage source. The two-way valves 18 and 19 will now be switched to interrupt the flow of air from bellows 1 to bellows 2. The vehicle body will then assume an upright vertical position in the same manner as described above after passing through a right-hand curve.

The discharge output of the compressor 28 is so adjusted that at different driving speeds and thus at different speeds of travel of the vehicle the compressor will always be able to supply the proper quantity of air from one bellows to the other to tilt properly the vehicle body as the vehicle travels through a curvilinear path. It is only when the vehicle travels along a curvilinear path that the supply reservoir 64 will not be filled by the compressor 28. If the pressure in the supply reservoir 64 should fall below the pressure in the air supply conduit 61 while the vehicle is travelling along a curved path, then the air will flow from the conduit 61 through check valve 63 until the pressure in reservoir 64 equals that as in the supply conduit 61. Since the compressor 28 is coupled to the axle of wheel 46 no air will be delivered while the vehicle is standing motionless. When the vehicle begins to move the supply reservoir 64 will be filled from air from conduit 61 until the pressure in the reservoir equals that in the supply conduit. When the vehicle has reached its normal speed, the compressor will be at its full output which will be sufficient during straight forward travel to maintain the pressure in the supply reservoir 64 at its maximum which is above the pressure in the air supply conduit 61.

In order to fill the supply reservoir 64 in the individual railway vehicles, air from the supply conduit 61 will be required only when the vehicle is starting and, during normal travel of the vehicle, only when the vehicle is proceeding over relatively long lengths of curved path. It will therefore not be necessary to increase the capacity of the compressor (not shown) which supplies air to the air supply conduit 61 for trains of considerable length when used in conjunction with the air supply system of the present invention.

The drawing illustrates the control circuit for an air suspension system located at one axle or on one truck at one end of a vehicle. A similar air suspension system according to the copending application, Ser. No. 808,225 filed Mar. 18, 1969 can also be provided at the other axle or on the truck at the other end of the vehicle and would be connected to the system disclosed herein at 71. Since the air suspension system would receive its necessary air supply at connection 71 the system disclosed as the present invention could be used at each end of a vehicle.

As a result of nonlinear changes of volume of bellows 1 and 2 and the filling of the previously empty conduits with compressed air and leakage losses in compressor 28, there will generally be a lowering vertically of the longitudinal tilt axis of the vehicle body during the above described tilting operations. The lowering of the longitudinal tilt axis will open the level regulating valve 43 to feed compressed air from supply conduit 44 into the conduits 39 and 40. Shutoff valve 24 which has now been opened will then deliver compressed air from conduit 39 through conduit 14 to bellows 1 until the longitudinal axis of tilt of the vehicle body has been raised up to its original level. When this level is reached valve 43 will close. During the travel of the vehicle through the constant radius portion of a curve, shutoff valves 5 and 6 will remain closed while shutoff valve 24 remains open.

Thus it can be seen that the present invention has disclosed an air suspension system for road and railway vehicles which receives only a portion of the required air under pressure from the main air supply conduit. The remaining portion of the required air is supplied by a wheel-driven compressor which pumps air from one bellows to the other while the vehicle is proceeding along a curved path and which pumps air to an air supply reservoir when the vehicle is proceeding along a straight path and the pressure in the reservoir is below a predetermined level. It is therefore possible to significantly increase the lengths of trains of vehicles having air suspension systems without the necessity for increasing the capacity of the main source of compressed air or the capacity of the main air supply conduit.

It will be understood that this invention is subject to modification in order to adapt it to different usages and condition.

I claim:

1. In a pneumatic suspension systems for vehicles, the combination of pneumatic supporting bellows means on each side of the vehicle body, a compressor having an intake and a discharge, valve means connecting said compressor intake and discharge and said bellows means for opening said intake and discharge to the atmosphere and for connecting said bellows means to said intake discharge, means responsive to the angular accelerations of the vehicle about a vertical axis for actuating said valve means to connect said intake with the bellows means on the vehicle side acted upon by the angular acceleration with respect to the front of the vehicle and said discharge to the bellows means on the other side of the vehicle so that air is pumped from the bellows on the inside of the curve to the bellows on the outside of the curve, an air reservoir connected to said bellows means to supply air thereto, and means responsive to the pressure in said air reservoir for connecting said compressor discharge from the reservoir to the atmosphere when a maximum pressure is reached within said reservoir.

2. In an air suspension system as claimed in claim 1 with said means comprising a pressure regulator connected between said compressor discharge and said air reservoir.

3. In an air suspension system as claimed in claim 2 and comprising an air supply conduit for the vehicle connected to said air reservoir, a check valve in the connection between said supply conduit and the reservoir, the pressure within the air supply conduit being less than the maximum filling pressure of said reservoir, said pressure regulator being responsive to the air reservoir pressure to open the compressor discharge to the atmosphere when the pressure in the reservoir reaches its maximum filled pressure.